POWER DIVISION OF A BROADBANDED COUPLER

INVENTORS E. A. J. MARCATILI
D. H. RING

BY Sylvan Sherman
ATTORNEY

May 18, 1965 E. A. J. MARCATILI ETAL 3,184,691

BRANCHING HYBRID COUPLER NETWORK USEFUL FOR BROADBAND POWER-DIVIDING, DUPLEXING AND FREQUENCY SEPARATION

Filed Nov. 29, 1961 4 Sheets-Sheet 2

INVENTORS E. A. J. MARCATILI
D. H. RING

BY Sylvan Sherman
ATTORNEY

INVENTORS E. A. J. MARCATILI
D. H. RING
BY Sylvan Sherman
ATTORNEY

INVENTORS E. A. J. MARCATILI
D. H. RING

BY Sylvan Sherman
ATTORNEY

United States Patent Office 3,184,691
Patented May 18, 1965

3,184,691

BRANCHING HYBRID COUPLER NETWORK USEFUL FOR BROADBAND POWER-DIVIDING, DUPLEXING AND FREQUENCY SEPARATION

Enrique A. J. Marcatili, Fair Haven, and Douglas H. Ring, Middletown Township, Monmouth County, N.J., assignors to Bell Telephone Laboratories, Incorporated, New York, N.Y., a corporation of New York Filed Nov. 29, 1961, Ser. No. 155,660
8 Claims. (Cl. 333—11)

This invention relates to electromagnetic wave transmission systems and, more particularly, to broadband power-dividing networks for use in such systems.

A directional coupler is a four branch power-dividing network in which the branches are arranged in pairs with the branches comprising each pair being conjugate to each other and in coupling relationship with the branches of the other of said paths. The power-division ratio of directional couplers is a matter of design. In the special case where the incident power applied to one branch of one pair of conjugate branches divides equally between the other pair of conjugate branches, the coupler is referred to as either a "3 db directional coupler" or as a "hybrid junction."

Directional couplers can be divided into two general classes. In one class, which includes the "magic tee" and the "rat race bridge," the output voltages are either inphase or 180 degrees out of time phase. The second class of directional couplers, which include the Riblet coupler, the multihole directional coupler and the semi-optical directional coupler, are quadrature phase shift devices in which the output voltages differ by 90 degrees. Of particular interest in connection with the present invention are the second class of couplers and it shall accordingly be understood that the term "directional coupler" or "hybrid" when used hereinafter refers to the quadrature phase shift type of directional coupler.

In the transmission and utilization of electromagnetic wave energy, it is often necessary to employ one or more directional couplers having a specified power-division ratio. Typical of such applications which use a single directional coupler are power-monitoring devices and power dividers. Typical applications which use two directional couplers are duplexing circuits, channel-dropping filters and band-splitting filters. However, because the power-division ratio of a directional coupler varies as a function of frequency, the performance of the above-mentioned devices is degraded when it is attempted to use them over a broad range of operating frequencies.

It is, accordingly, the object of this invention to increase the useful frequency range of operation of directional couplers.

In the simple power-monitoring or power-dividing application, it is a function of the coupler to divide the incident wave energy in some arbitrary power ratio over the frequency range of operation. This generally involves using a single directional coupler in which the coupling apertures are designed for the desired power ratio. As indicated above, however, the power ratio varies as a function of frequency. It has been discovered, nevertheless, that two substantially identical hybrids can be connected in such a manner that the final device is a directional coupler with any desired power-division ratio and that this power division is substantially less frequency sensitive than that of the individual hybrids.

As is known, the power ratio of the combination of two interconnected directional couplers varies as a function of the power ratio of the individual couplers and the relative phase shift introduced by the interconnecting wave paths. In accordance with the invention, this variation in the power ratio of the individual couplers is minimized by causing the relative phase shift introduced by the interconnecting wave paths to vary in a compensating manner.

In a first illustrative embodiment of the invention, the requisite compensating phase delay is produced by proportioning appropriately the lengths and cross-sectional dimensions of the interconnecting wave paths.

In applications which normally utilize two 3 db directional couplers, such as a radar duplexing circuit, a pair of conjugate branches of one coupler and a pair of conjugate branches of a second coupler are interconnected by means of a pair of wave paths having substantially similar electrical properties and which introduce no relative phase shift to the wave energy propagated therethrough. The wave energy in the two wave paths recombines in the second coupler and leaves the network by way of one of the branches of the second pair of conjugate branches. To the extent that the two couplers are balanced, all the wave energy leaves by way of the one branch. However, as the power division of the couplers varies as a function of frequency, some of the energy is diverted to the other branch of the second pair of conjugate branches.

It has been discovered that by diverting the total output from the one branch to the other branch of the second pair of conjugate branches by the introduction of a broadband 180 degree relative phase shift in one of the interconnecting wave paths, a duplexing circuit that is substantially independent of frequency is obtained.

In a second embodiment of the invention illustrative of a broadband duplexing circuit using rectangular waveguide, a 180 degree relative phase shift is introduced into one of the interconnecting wave paths by rotating the one path about its longitudinal axis 180 degrees relative to the other wave path. The 180 degree spatial rotation is used to produce the equivalent of a broadband 180 degree time phase difference.

Broadband band-splitting filters and broadband channel-dropping filters are also obtained by introducing a 180 degree relative phase shift in the wave paths interconnecting the two 3 db directional couplers normally used in such devices.

These and other objects and advantages, the nature of the present invention, and its various features, will appear more fully upon consideration of the various illustrative embodiments now to be described in detail in connection with the accompanying drawings, in which.

Figure 4:
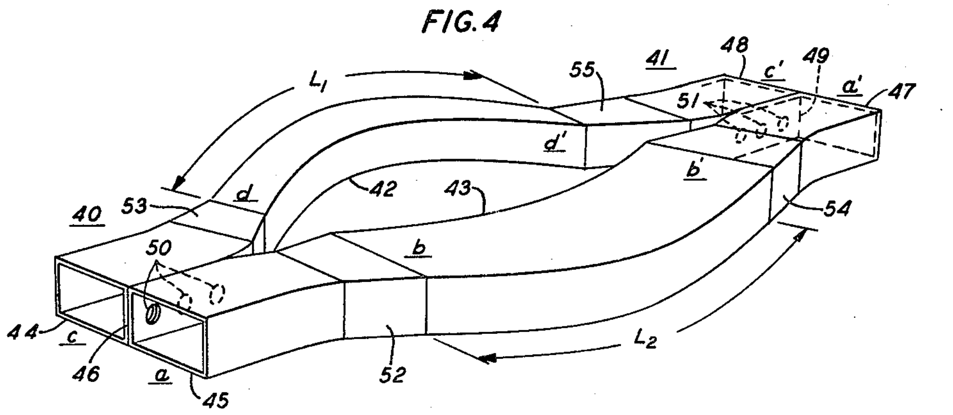
FIG. 4 is an illustrative embodiment of the invention using rectangular waveguide.
Figure 4A:
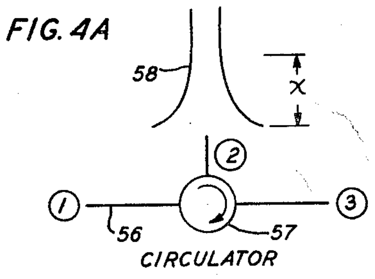
Figure 5:
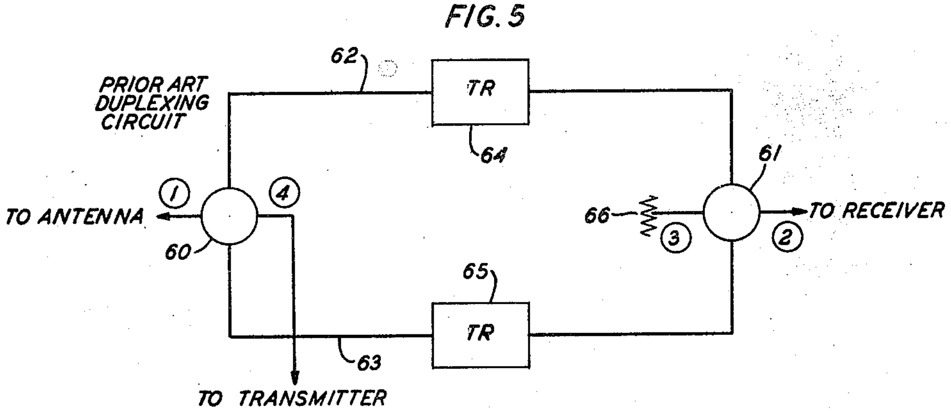
Figure 6:
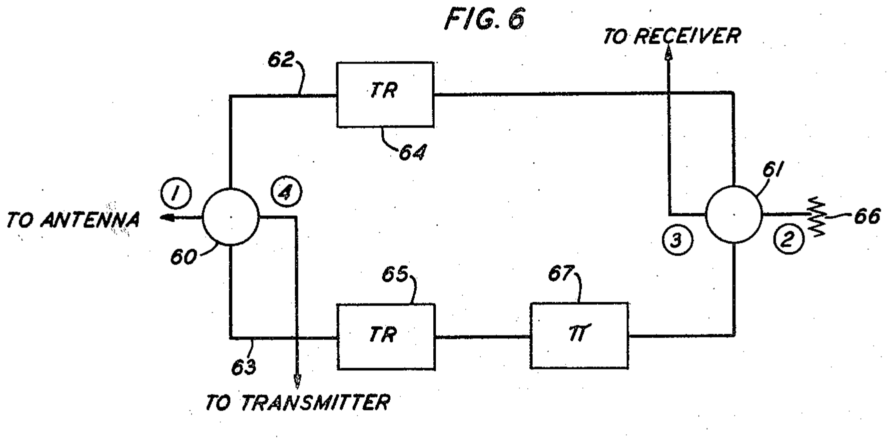
Figure 7:
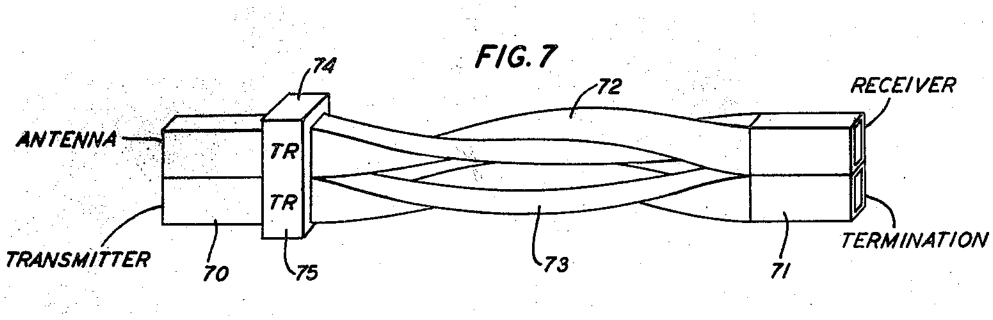
Figure 8:
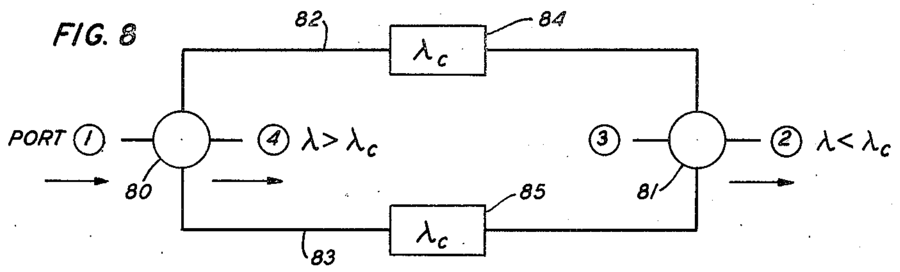
Figure 9:
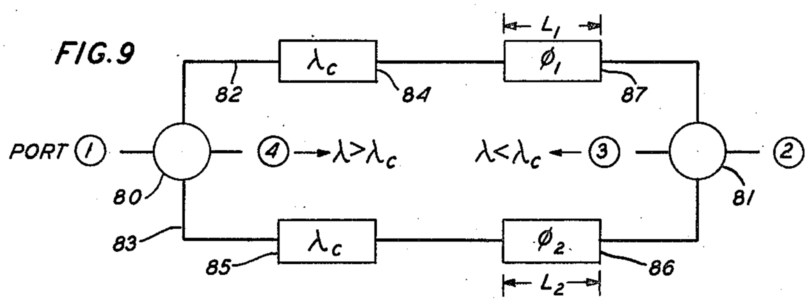
Figure 10:
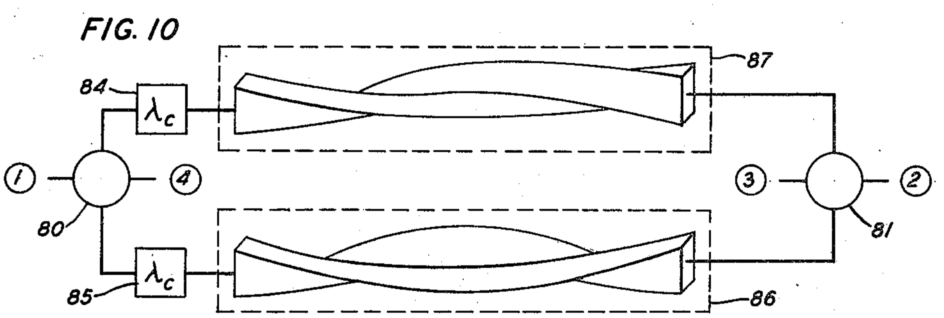
Figure 11:
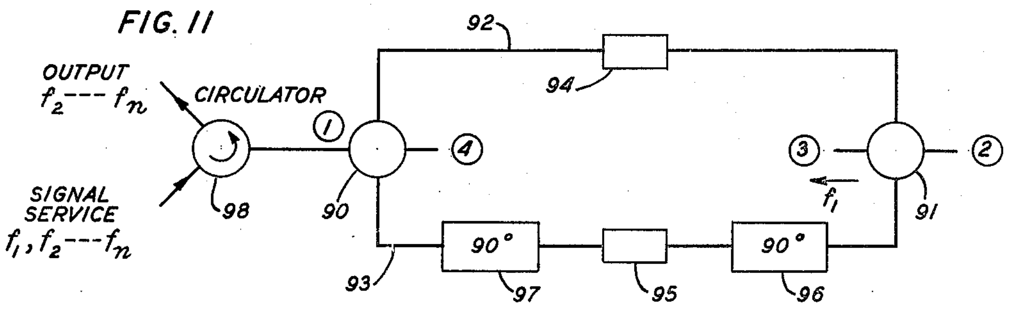

FIG. 4*a* shows schematically a method of obtaining a predetermined phase shift as a function of wavelength;

FIG. 5 shows schematically a prior art duplexing circuit;

FIG. 6 shows schematically a broadband duplexing circuit in accordance with the invention;

FIG. 7 shows, in perspective, a broadband duplexing circuit using rectangular waveguide in accordance with the invention;

FIG. 8 shows schematically a prior art band-splitting filter;

FIG. 9 shows schematically a broadband band-splitting filter in accordance with the invention;

FIG. 10 shows an arrangement in accordance with the invention for obtaining a broadband 180 degree time phase delay in a band-splitting filter using rectangular waveguide; and FIG. 11 shows schematically a broadband channel-dropping filter in accordance with the invention.

Figure 1:
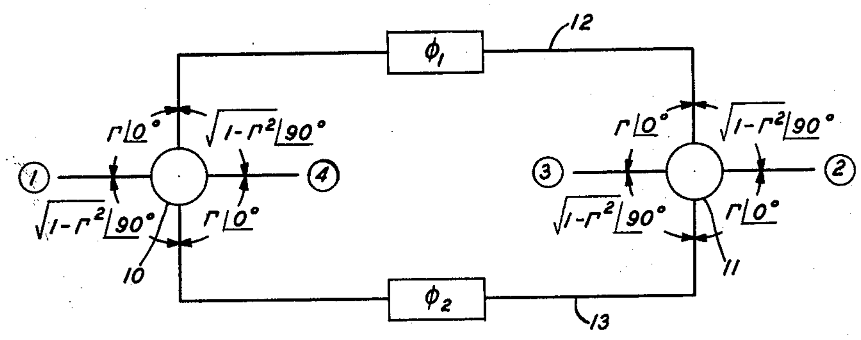
FIG. 1 shows schematically a broadband power-dividing network in accordance with the invention.

Referring to FIG. 1, there is shown schematically a broadband power-dividing network comprising two substantially identical directional couplers 10 and 11 connected by means of two wave paths 12 and 13 of electrical lengths $\varphi_1$ and $\varphi_2$, respectively.

The term "directional coupler" is used in its accepted sense to describe a power-dividing network having four branches (or ports) in which the branches are arranged in pairs with the branches comprising each pair being conjugate to each other and in coupling relationship to the branches of the other of said pairs. In particular, the directional couplers are of a type whose scattering matrix is symmetrical with respect to both diagonals and independent of the order in which the ports are selected. This includes a large variety of directional couplers such as the Riblet coupler (H. J. Riblet, "The Short-Slot Hybrid Junction," Proceedings of the Institute of Radio Engineers, vol. 40, No. 2, February 1952, pages 180 to 184), the multihole directional coupler (S. E. Miller, "Coupled Wave Theory and Waveguide Applications," Bell System Technical Journal, vol. 33, May 1954, pages 661 to 719) and the semi-optical directional coupler (E. A. J. Marcatilli, "A Circular Electric Hybrid Junction and Some Channel-Dropping Filters," Bell System Technical Journal, vol. 40, January 1961, pages 185 to 196). In each of the above-mentioned power-dividing networks, there is a 90 degree relative phase shift between the output wave components. This is indicated by the ninety degree designation ($\angle 90°$) associated with the $\sqrt{1-\Gamma^2}$ terms.

To avoid unnecessary repetition, the generic term "directional coupler" shall be understood to refer to a power-dividing network having the above-described characteristics. In the special case where the input power divides equally, the terms "3 db directional coupler," "hybrid junction" or simply "hybrid" shall be used.

Power entering any port of coupler 10 or 11 is divided into two parts $\Gamma^2$ and $1-\Gamma^2$ where $\Gamma$ is a positive quantity smaller than one. The power ratio $r$ measures the output power-division ratio of each individual bybrid and is given by $$r\frac{1}{\Gamma^2}-1 \qquad (1)$$

After traversing the paths 12 and 13, the two components recombine in the other coupler and leave by way of ports 2 and 3. The ratio R between the outputs $P_2$ and $P_3$ at ports 2 and 3, respectively, measures the over-all power division of the total network and is given by $$R=\frac{P_2}{P_3}=\frac{(1+r)^2}{4r}\sec^2\frac{\varphi}{2}-1 \qquad (2)$$

where $\varphi=\varphi_1-\varphi_2$.

It will be noted that the device of FIG. 1, comprising the two interconnected directional couplers 10 and 11, is also a directional coupler which shall, hereinafter, be referred to as "broadband."

Figure 2:
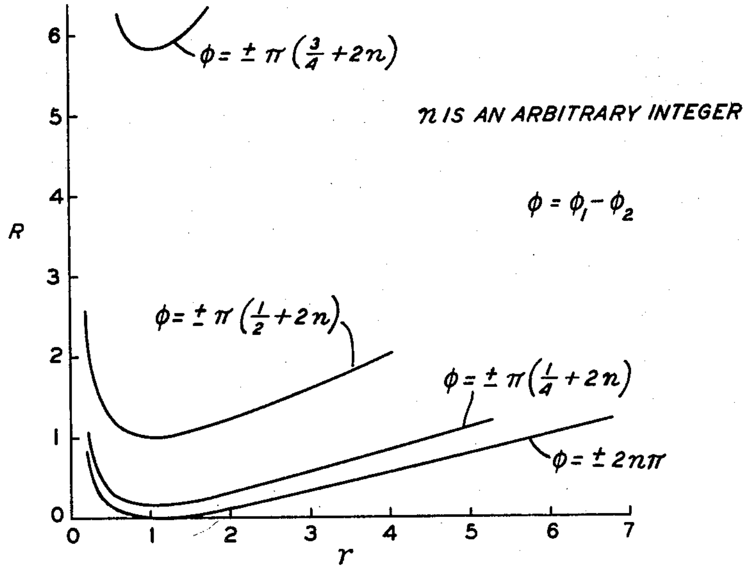
FIGS. 2 and 3 show the variations in the over-all power-dividing ratio of the network of FIG. 1 as a function of the power-dividing ratio of the component hybrids.
Figure 3:
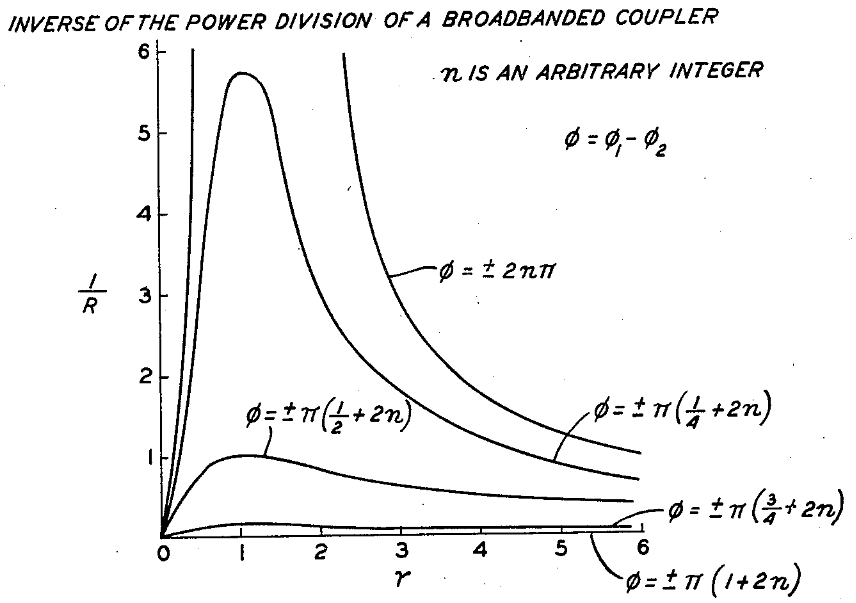

FIGS. 2 and 3 are a plot and R and 1/R, respectively, as a function of $r$ using $\varphi$ as a parameter. Each of these curves passes through a minimum (FIG. 2) or a maximum (FIG. 3) for $r=1$. This means that the power-division ratio R of the broadband coupler made, for example, of two 3 db directional couplers is insensitive to the first order variations of the power-division $r$ of the individual directional couplers. In the limiting case of $\varphi=\pi$, for which $1/R=0$, the power division of the broadband directional coupler is totally independent of $r$. This fact will be utilized hereinafter in the design of a broadband band-splitting and channel-dropping filters and in the design of a broadband duplexing circuit.

In general, not only $r$ but $\varphi$ is also frequency dependent and, in principle, it is possible to design the paths 12 and 13 connecting the couplers 10 and 11 in such a way that $\varphi$ tracks $r$, thus making R completely frequency independent. This is not an easy task. What can easily be done, however, is to design the interconnecting wave paths 12 and 13 so that R is substantially independent of frequency (or varies between given limits) over some preselected frequency range. One arrangement for doing this, shown in FIG. 4, comprises a pair of substantially identical 3 db directional couplers 40 and 41 interconnected by means of two wave paths 42 and 43 which have preselected electrical properties.

Each of the directional couplers comprises a pair of rectangular waveguides of substantially similar cross-sectional dimensions aligned parallel to each other and sharing a common narrow wall. Referring to FIG. 4, directional coupler 40 is made up of waveguides 44 and 45 which share a common narrow wall 46. Directional coupler 41 is made up of waveguides 47 and 48 which share the common narrow wall 49. Distributed along the common walls 46 and 49 are the coupling apertures 50 and 51, respectively. The size and distribution of the coupling apertures are designed in accordance with procedures well known in the art as described in the above-cited Riblet article or in an article by S. E. Miller and W. W. Mumford published in the September 1952 Proceedings of the Institute of Radio Engineers, vol. 40, at pages 1071 to 1078. Each of the directional couplers has two pairs of conjugate branches $a$–$c$ and $b$–$d$ and $a'$–$c'$ and $b'$–$d'$.

Interconnecting one pair of conjugate branches $b$–$d$ of coupler 40 and one pair of conjugate branches $b'$–$d'$ of coupler 41 are the waveguides 42 and 43. In particular, guide 42 having a length $L_1$ and cut-off wavelength $\lambda_{c1}$ connects branch $d$ to branch $d'$ and guide 43 having a length $L_2$ and cut-off wavelength $\lambda_{c2}$ connects branches $b$ and $b'$.

Because the cross-sectional dimensions of guides 42 and 43 are, in general, different than the cross-sectional dimensions of guides 44, 45, 47 and 48, matching sections 52, 53, 54 and 55 are interposed between the couplers and the interconnecting guides. These matching sections can be either tapered sections, as shown, or quarter wave transformers or any other type of matching network known in the art.

The relative phase difference $\varphi$ for the two paths 42 and 43 is given as $$\varphi=\pi\left[\frac{L_1}{\lambda_{g1}}-\frac{L_2}{\lambda_{g2}}\right] \qquad (3)$$

where $\lambda_{g1}$ and $\lambda_{g2}$ are the guided wavelengths at any particular frequency.

It is possible to select $L_1$, $L_2$ and the cut-off wavelengths $\lambda_{c1}$ and $\lambda_{c2}$ to minimize the frequency sensitivity of the power-division R of the broadbanded coupler. In particular, we want to minimize the wavelength sensitivity of the power-division R, as given by Equation 2, of the broadband coupler. Since the useful bandwidth covers only a few percent around the center wavelength $\lambda_0$, let us expand $r$ and $\varphi$ in a Taylor's series:

$$r=1+\delta r'+\frac{\delta^2}{2!}r''+\cdots \qquad (4)$$

$$\varphi=\varphi_0+\delta\varphi'+\frac{\delta^2}{2!}\varphi''+\cdots \qquad (5)$$

where $$\delta=\frac{\lambda-\lambda_0}{\lambda_0} \qquad (6)$$

$\lambda$ being the wavelength at any frequency, $$r^{(n)}=\lambda_0^n\frac{d^nr}{d\lambda^n} \qquad (7)$$

and $$\varphi^{(n)}=\lambda_0^n\frac{d^n\varphi}{d\lambda^n} \qquad (8)$$

the derivatives being taken at $\lambda=\lambda_0$.

If one selects $$L_2=\frac{\lambda_{g10}}{\lambda_{g20}}L_1 \tag{9}$$

where $\lambda_{g10}$ and $\lambda_{g20}$ are the guided wavelengths in the two paths at $\lambda=\lambda_0$, it follows from (3), (8) and (9) that $$\varphi_0=\frac{2\pi L_1}{\lambda_{g10}}\left(1-\frac{\lambda_{g10}^2}{\lambda_{g20}^2}\right) \tag{10}$$

$$\varphi'=0 \tag{11}$$

and $$\varphi''=\varphi_0\left(\frac{\lambda_{g10}\lambda_{g20}}{\lambda_0}\right)^2 \tag{12}$$

Substituting (4) and (5) in (2) and replacing the values of $\varphi'$ and $\varphi''$ found in (11) and (12), one obtains an approximate expression for the power division (taking terms of $r$ up to $r''$)

$$R=\tan_2 \varphi_0\left[1+\left(\frac{\delta}{2}\right)^{22}\frac{(r')^2+\left(\frac{\lambda_{g10}\lambda_{g20}}{\lambda_0^2}\right)^2 2\varphi_0 \tan\frac{\varphi_0}{2}}{\sin^2\frac{\varphi_0}{2}}\right] \tag{13}$$

Terms with powers of $\delta$ bigger than two have been neglected and the result is not valid in the neighborhood of $\varphi_0=\pm\pi$ because the term in $\delta^2$ diverges.

It is seen from Equation 13 that the power division R of the broadband coupler is proportional to $\delta^2$ and therefore is far less frequency sensitive than the power division of each individual directional coupler as given by Equation 4, which is proportional to $\delta$. Furthermore, R is independent of $r''$. This means that if $r'=0$, as it can be with multihole directional couplers, then R varies only because of the frequency sensitivity of the connecting paths.

Assuming for the time being that in Equation 13

$$(r')^2+\left(\frac{\lambda_{g10}\lambda_{g20}}{\lambda_0^2}\right)^2 2\varphi_0 \tan\frac{\varphi_0}{2}>0 \tag{14}$$

then, the power division of the broadbanded coupler is a parabola with a minimum $$R_0=\tan^2\frac{\varphi_0}{2} \tag{15}$$

at $\delta=0$. At $\delta=\pm\delta_m$, the power division is $$R_m=\tan^2 \varphi_0\left[1+\left(\frac{\delta_m}{2}\right)\frac{2(r')^2+\left(\frac{2\lambda_{g10}\lambda_{g20}}{\lambda_0}\right)^2 \varphi_0 \tan \varphi_0}{\sin^2 \varphi_0}\right] \tag{16}$$

The wavelengths associated with $\pm\delta_m$ are deduced from (6) to be $$\lambda_a=\lambda_0(1-\delta_m) \tag{17}$$
$$\lambda_b=\lambda_0(1+\delta_m)$$

We define them to be the extreme wavelengths of the band of operation of the broadband coupler and therefore $R_0$ and $R_m$ are the minimum and maximum power division of the coupler. We minimize the departure of $R_0$ and $R_m$ from the ideal power division $R_i$ by making $$R_m-R_i=R_i-R_0 \tag{18}$$

Substituting the expressions given in (15) and (16), for $R_0$ and $R_m$ in (18) one derives $$\varphi_0=\pm 2\{\tan^{-1}[R_i(1-\Delta)]^{1/2}+n\pi\} \tag{19}$$

where $$\Delta\frac{1}{2}=\left(\frac{\delta_m}{2}\right)^2\left(1+\frac{1}{R_i}\right)\left[(r')^2+\left(\frac{2\lambda_{g10}\lambda_{g20}}{\lambda_0^2}\right)^2\sqrt{R_i}\,(\tan^{-1}\sqrt{R_i}+n\pi)\right] \tag{20}$$

$n$ being an integer and the inverse trigonometric function being chosen in the first quadrant.

The explicit values of $R_0$ and $R_m$ are derived from (15), (16) and (19) to be $$R_0=R_i(1-\Delta) \tag{21}$$

$$R_m=R_i(1+\Delta) \tag{22}$$

It can be shown that these results are also valid if $$(r')^2+\left(\frac{\lambda_{g10}\lambda_{g20}}{\lambda_0^2}\right)^2 2\varphi \tan\frac{\varphi_0}{2}<0 \tag{23}$$

only that for the situation given by Equation 23 $R_m$ is the minimum power division achieved by the broadband coupler in the band of interest and $R_0$ is the maximum.

Let us consider a numerical example. We want a broadband hybrid that operates between $$\lambda_a=0.9\lambda_0 \tag{24}$$

$$\lambda_b=1.1\lambda_0 \tag{25}$$

The power division of each component hybrid is $$r=1+2.6\delta \tag{26}$$

and consequently, $$r'=2.6 \tag{27}$$

Then the power division $r$ at $\lambda_a$ and $\lambda_b$ is approximately $\pm 1$ decibel.

The ideal power division of a balanced hybrid is $$R_i=1 \tag{28}$$

and the extreme values of $\delta$ are deduced from (17), (24) and (25) to be $$\delta_m=\pm 0.1 \tag{29}$$

The substitution of these numerical values in (10), (11), (19), (21) and (22) yields $$R_0=1-\Delta \tag{30}$$

$$R_m=1+\Delta \tag{31}$$

$$\Delta=0.0025\left[2.6^2+\left(\frac{\lambda_{g10}\lambda_{g20}}{\lambda_0^2}\right)^2(4n+1)\pi\right] \tag{32}$$

and $$L_1=\pm\frac{\lambda_{g10}}{\pi\left(1-\frac{\lambda_{g10}^2}{\lambda_{g20}^2}\right)}[\tan^{-1}(1-\Delta)^{1/2}+n\pi] \tag{33}$$

Since we want to make $\Delta$ as small as possible we choose $$n=0 \tag{34}$$

(It should be noted that if $r'$ in (20) was big enough, it would be possible to choose $n$ negative and make $\Delta=0$. Then the power division R would be sensitive only to powers of $\delta$ bigger than two.) We could also select $$\lambda_{g10}\cong\lambda_{g20}\quad\lambda_0 \tag{35}$$

but $L_1$ and $L_2$ given by (9) and (33) would be long. The choice of $\lambda_{g10}$ and $\lambda_{g20}$ must be made then as a compromise to the demands on $\Delta$, $L_1$ and $L_2$.

Let us choose arbitrarily $$\frac{\lambda_{g20}}{\lambda_0}=1.3 \tag{36}$$

(for $\lambda_0=3$ cm. [10 kmc.] and RG/52 $\mu$ waveguide, $$\left.\frac{\lambda_{g20}}{\lambda_0}=1.3\right)$$

and $$\frac{\lambda_{g10}}{\lambda_0}=1.25 \tag{37}$$

Then substituting (34), (35) and (36) in (30), (31), (32), (33) and (9) one derives $$10\log_{10} R_0=-0.16\text{ db} \tag{38}$$

$$10\log_{10} R_m=0.16\text{ db} \tag{39}$$

$$L_1=4.16\ \lambda_0 \tag{40}$$

$$L_2=4\ \lambda_0 \tag{41}$$

For $0.9\lambda_0<\lambda<1.1\lambda_0$ the power division of the component couplers is better than $\pm 1$ decibel, while that of the broadbanded coupler is better than $\pm 0.16$ decibel. The dimensions of the connecting paths are derived from (36), (37), (40) and (41).

In the embodiment of FIG. 4, the two wave paths 42 and 43 are shown as having different physical lengths and different physical cross-sectional dimensions. It is understood, however, that the required differences in electrical length and cut-off frequency for the two paths could also be obtained with waveguides of equal physical length and cross-sectional dimensions by means of dielectric loading of the waveguides. The use of dielectric material to alter the electrical properties of waveguides is well known and hence needs no further comment at this point.

It will also be noted that while the embodiment of FIG. 4 is shown made up of rectangular waveguide, there is nothing in the above analysis limited to rectangular waveguides. To the contrary, the principles of the invention are general and readily applicable to all types of wave transmission media.

In the illustration given above, each of the wave paths 42 and 43 consisted of a length of uniform waveguide. More accurate tracking of the power-division ratio $r$ and, hence, more uniform over-all power division can be obtained by making each wave path consist of a plurality of cascaded sections of different electrical lengths having different cut-off wavelengths in a manner known in the art.

An alternate method of obtaining a relative phase shift having a predetermined frequency dependency is illustrated schematically in FIG. 4a and comprises a wave path 56 in which there is inserted a three port circulator 57. Connected to port 2 of circulator 57 is a length of tapered transmission line 58. Wave energy entering port 1 of circulator 57 is diverted to port 2 and traverses the tapered line 58 until cut off. Upon reflection it reenters port 2 of circulator 57 and is diverted to port 3.

The total phase shift experienced by the wave energy in traversing the tapered line is given by $$\varphi=\int_0^l \frac{4\pi}{\lambda}\sqrt{1-\left[\frac{\lambda}{\lambda_c}(x)\right]^2}dx \tag{42}$$

where $\lambda_c\ (x)$ is the cut-off wavelength at any distance $x$ along the taper and $l$ is the length of the tapered section at which any wavelength $\lambda$ cuts off. The taper is designed to give the required phase shift $$\varphi=2\cos^{-1}\frac{1+r}{\sqrt{4r(1+R)}} \tag{43}$$

at any wavelength $\lambda$ as derived from Equation 2.

It has been shown that, in general, the response of circuits comprising two substantially identical hybrid junctions depends upon the relative phase shift produced by the interconnecting wave paths. By suitable design of the interconnecting paths the phase can be controlled to compensate for known variations in the response of the component hybrids. In general, for circuits like that of FIG. 1 with input in port 1, if the phase difference $\varphi_1-\varphi_2=2n\pi$ all the power is recovered at port 2 but if $\varphi_1-\varphi_2=\pi(1+2n)$ all the power is recovered at port 3. The latter arrangement, however, operates over a substantially wider frequency band for the same value of $n$. This property can be used to advantage in connection with a duplexing circuit. In this type circuit a high degree of balance over a wide band of frequencies is desirable.

FIG. 5 shows a commonly used duplexing circuit comprising two hybrid junctions 60 and 61 interconnected by means of wave paths 62 and 63. Each wave path has a power sensitive switch 64 and 65 of the type generally referred to as a "TR" switch which permits the passage of wave energy below a critical power level but reflects wave energy above that level. A receiver is connected to port 2 of hybrid 61 and a dissipative termination 66 is connected to port 3 of hybrid 61. A transmitter and a common antenna are connected to ports 4 and 1, respectively, of hybrid 60.

In operation a high power signal, derived from the transmitter, is applied to port 4 of hybrid 60 in which it is divided and applied to the interconnecting wave paths 62 and 63. Because the power content of the signal exceeds the breakdown level for the TR switches, the signal upon reaching TR switches 64 and 65 causes them to break down and appear as a short circuit to the incident wave energy. The latter is then reflected by the TR switches and caused to recombine in hybrid 60. The recombined signal leaves hybrid 60 by way of port 1 and is applied to the antenna.

Because there tends to be some leakage of power past the TR switches, a resistive load 66 is connected to port 3 of hybrid 61 to dissipate this spurious component of wave energy. If the power division in hybrids 60 and 61 is unbalanced, some of this spurious wave energy is not dissipated in load 66 but instead appears at port 2 of hybrid 61 and hence is coupled to the receiver. Because the latter is designed to handle only relatively weak signals, the application of a relatively large spurious signal can damage the receiver.

The duplexing circuit of FIG. 5 can be improved with respect to coupler deficiencies and thereby extend the frequency range over which a duplex circuit can be safely operated, by inserting a 180 degree phase shift in one of the interconnecting lines as shown in FIG. 6. FIG. 6 is substantially the same as FIG. 5 (the same identifying numerals are used in FIG. 6 where applicable as were used in FIG. 5) except that a 180 degree phase shifter 67 has been added to line 63 and, as a result, the receiver is now connected to port 2 of hybrid 61. So modified, the power-division ratio for the spurious signal that leaks past the TR switches is maintained constant over a broader frequency range and hence substantially none of the spurious power is directed to the receiver regardless of any unbalance in the individual hybrids.

FIG. 7 shows a duplexing circuit using rectangular waveguide which makes up into a neat mechanical package. The circuit comprises a pair of Riblet type couplers 70 and 71 interconnected by the two waveguides 72 and 73. TR switches 74 and 75 are inserted between coupler 70 and each of the guides 72 and 73.

With the interconnecting wave paths made of rectangular waveguide, a simple and convenient means of obtaining a broadband 180 degree relative time phase difference is to physically rotate one of the waveguides about its longitudinal axis 180 degrees with respect to the other waveguide. This is illustrated in FIG. 7 wherein guide 72 is shown having a 180 degree twist whereas 73 is twisted 90 degrees in one direction and then twisted 90 degrees in the opposite direction for a net rotation of zero degrees. Guide 73 is twisted in this manner so that the two guides 72 and 73 have equal physical lengths. Electrically, however, the guides have the equivalent of a time phase difference of exactly 180 degrees at all frequencies capable of being supported within the waveguides.

Heretofore we have considered means for increasing the range of frequency over which incident wave energy can be divided into some arbitrary power ratio over the entire frequency range of interest. Let us now consider another application of the principles of the invention in which the incident wave energy is divided into two frequency subbands in which all the energy in one subband is directed to one output port and in which the remaining energy in the second subband is directed to a second output port. As will be shown, the range of operation of such band-splitting networks can also be made several times wider by using the broadbanding technique described herein.

A band-splitting filter is a device of paramount importance for the separation of channels in the proposed long distance waveguide communication system described by S. E. Miller in an article entitled "Waveguide as a Communication Medium," published in the November 1954 issue of the Bell System Technical Journal at pages 1209 to 1265. The band-splitting filter consists, as shown in FIG. 8, of two hybrids 80 and 81, connected by two substantially identical wave paths 82 and 83. Each path has a high-pass filter 84 and 85 that cuts off at wavelength $\lambda_c$. Power entering port 1 divides equally between the two balanced arms of hybrid 80 and travels towards the second hybrid 81. Power at wavelengths less than $\lambda_c$ passes through the filters and is delivered to port 2. Power at wavelengths greater than $\lambda_c$ is reflected by the filters and is delivered to port 4. It can be shown that even when the power division of the hybrids is unbalanced by as much as three decibels, the power recovered in ports 2 or 4 has only a 0.5 decibel insertion loss. While hybrids currently available have a better balance than three decibels from 35 to 75 kilomegacycles (8.57 millimeters to 4 millimeters), nevertheless beyond that range a band-splitting filter using such hybrids behaves poorly.

In order to handle a much wider band with the same hybrids we can follow one of two different methods. One of them consists in broadbanding each one of the hybrids as explained previously but then each band-splitting filter requires four hybrids and, furthermore, the band of operation of the broadband filter is still limited by the frequency sensitivity of the power division of each component hybrid as shown in FIG. 3, for curve $$\varphi=\frac{\pi}{2}$$

A second method that bypasses these drawbacks consists in treating the hybrids of the band-splitting filter for wavelengths less than $\lambda_c$ as the components of a broadband directional coupler with ideal power-division $$\frac{1}{R_i}=0$$

As shown in FIG. 3, for curve $\varphi=\pi$ the power-division $$\frac{1}{R}=0$$

is independent of the power-division $r$ of the component hybrids.

FIG. 9 depicts schematically a broadband band-splitting filter in accordance with the invention comprising the pair of hybrids 80 and 81 interconnected by means of paths 82 and 83. Path 83 includes the high-pass filter 85 having a cut-off wavelength $\lambda_c$ and a length of line 86 of physical length $L_2$ and electrical length $\varphi_2$ having a cut-off wavelength $\lambda_{c2}$. Path 82 also includes a high-pass filter 84 having a cut-off wavelength $\lambda_c$ and a length of line 87 of physical length $L_1$ and electrical length $\varphi_1$ having a cut-off wavelength $\lambda_{c1}$. For wavelengths $\lambda>\lambda_c$, the band-splitting arrangement of FIG. 8 and the broadband arrangement of FIG. 9 are identical. For wavelengths $\lambda<\lambda_c$, the device behaves as a broadband hybrid in which the reciprocal power ratio $$\frac{1}{R}=0$$

Ideally, if $\varphi=\varphi_1-\varphi_2$ can be made equal to 180 degrees over the frequency band of interest, then the power ratio $$\frac{1}{R}$$

is independent of frequency

If the interconnecting wave paths are made of rectangular waveguide, a simple and convenient method of obtaining a broadband 180 degree time phase difference is to physically rotate one of the waveguides about its longitudinal axis 180 degrees with respect to the other waveguide as explained in connection with the duplexing circuit shown in FIG. 7. This is illustrated in FIG. 10 which shows, in block diagram, the input and output hybrids 80 and 81, high-pass filters 84 and 85 and the lengths of lines 86 and 87. More specifically, lines 86 and 87 are shown as sections of rectangular waveguide of substantially equal cross-sectional dimensions. Section 87 is shown as having a 180 degree twist whereas section 86 is shown twisted 90 degrees in one direction and then 90 degrees back again, thus making the lines have the equivalent of a time phase difference of exactly 180 degrees at all frequencies capable of being supported within the waveguide.

Where the simple expedient of twisting the wave paths to obtain a 180 degree time phase difference cannot be resorted to, the technique described above in connection with the embodiment of FIG. 4 can be employed or any other means for obtaining the requisite time phase difference can be employed.

For purposes of illustration, a system using semi-optical hybrids of the type disclosed by E. A. J. Marcatili is considered. We know that the shortest wavelength at which the available semi-optical hybrids provide tolerable insertion loss (0.5 decibel) is 4 millimeters. Therefore we choose $\lambda_c=4$ mm. This is also the longest wavelength that must be received by the second hybrid and, consequently, is the longest wavelength of operation of the broadband coupler. Then, using the same notation as was used above, $$\lambda_b=\lambda_c=4 \text{ mm.} \tag{44}$$

Starting with the exact expression (2) and noting that R is to be as large as possible, we make a conservative approximation by replacing $$\frac{(1+r)^2}{4r}$$

by its minimum value of one. Then $$R=\tan^2\frac{\varphi}{2} \tag{45}$$

In order to minimize the wavelength sensitivity we satisfy Equation 9 and select the connecting paths $L_1$ and $L_2$, in FIG. 9, to be far from cut-off. Consequently, the cut-off wavelengths $\lambda_{c1}$ and $\lambda_{c2}$ obey the inequality $$\lambda_{c1}, \lambda_{c2}\gg\lambda \tag{46}$$

and $\varphi$ from Equation 3 can be expanded in powers of $\lambda$. Then Equation 45 reduces to $$R\cong\tan^2\left[\frac{\varphi_0}{2}\left(\frac{\lambda_0}{\lambda}+\frac{\lambda}{\lambda_0}\right)\right] \tag{47}$$

where $$\varphi_0=\pi L_1\lambda_0\left(\frac{2}{\lambda_{c2}^2}-\frac{2}{\lambda_{c1}^2}\right) \tag{48}$$

Again, by making the extreme departures of the power-division $R_0$ and $R_m$ at wavelengths $\lambda=\lambda_a$ and $\lambda=\lambda_b$ equidistant from the ideal $R_1$, we obtain $$R_0=R_m=\tan^2\frac{\varphi_0}{2}=\tan^2\left[\frac{\varphi_0}{4}\left(\frac{\lambda_0}{\lambda_a}+\frac{\lambda_a}{\lambda_0}\right)\right] =\tan^2\left[\frac{\varphi_0}{4}\left(\frac{\lambda_0}{\lambda_b}+\frac{\lambda_b}{\lambda_0}\right)\right] \tag{49}$$

Since $$R_0, R_m\gg1 \tag{50}$$

the minimum value of $|\varphi_0|$ derived from Equation 49 is $$|\varphi_0|\cong\pi-\frac{2}{\sqrt{R_0}} \tag{51}$$

From Equation 49 it also follows that $$\lambda_a=\lambda_0\frac{1-\left(\frac{2}{\pi R_0^{1/2}}\right)^{1/2}}{1+\left(\frac{2}{\pi R_0^{1/2}}\right)^{1/2}} \tag{52}$$

$$\lambda_b=\lambda_0\frac{1+\left(\frac{2}{\pi R_0^{1/2}}\right)^{1/2}}{1-\left(\frac{2}{\pi R_0^{1/2}}\right)^{1/2}} \tag{53}$$

and from (9), (48) and (51) that $$L_1=\frac{\lambda_{c1}^2}{2\lambda_0}\left[\frac{1-\frac{2}{\pi R_0^{1/2}}}{\frac{\lambda_{c1}^2}{\lambda_{c2}^2}-1}\right] \tag{54}$$

and $$L_2=L_1-\frac{\lambda_0}{4}\left(1-\frac{2}{\pi R_0^{1/2}}\right) \tag{55}$$

Now we complete the numerical calculations of the broadbanded band-splitting filter using circular waveguide propagating the circular electric mode. By assuming that the tolerable insertion loss between ports 1 and 3 of FIG. 9 is 0.5 decibel, one derives that $$10\log\left(\frac{1}{R_0}+1\right)=0.5\ db \tag{56}$$

and consequently $$R_0=8.2 \tag{57}$$

Since $\lambda_b=4$ mm. has been fixed previously (44), we deduce from (52), (53) and (57) that $$\lambda_0=1.44\text{ mm.} \tag{58}$$

and $$\lambda_a=0.517\text{ mm.} \tag{59}$$

We noted before that the band between 35 and 75 kilomegacycles (8.58 to 4 mm.) is received in port 4 of FIG. 9, with an insertion loss not greater than 0.5 decibel. We find now that the band between 75 and 580 kilomegacycles (4 to 0.517 mm.) is received in port 3 also with an insertion loss not greater than 0.5 decibel. Each of these subbands can, in turn, be further divided by using additional band-splitting filters if required.

The lengths $L_1$ and $L_2$ and the cut-off wavelengths $\lambda_{c1}$ and $\lambda_{c2}$ have not been determined yet. They can be calculated from (54) and (55). $\lambda_{c1}$ and $\lambda_{c2}$ can be selected arbitrarily, but since the hybrids are typically made with two inch I.D. circular waveguide, we choose the upper path of the same diameter. Then for the $TE_{01}^0$ mode $$\lambda_{c1}=\frac{2\pi}{3.832}=1.64''=41.6\text{ mm.}$$

The choice $\lambda_{c2}$ controls the length of $L_1$ and $L_2$. As a matter of fact, for $\lambda_{c2}<\lambda_{c1}$, $L_1$ and $L_2$ decrease monotonically with decreasing $\lambda_{c2}$. Several examples are calculated and tabulated below:

| $\frac{\lambda_{c2}}{\lambda_{c1}}$ | $L_1$ | $L_1-L_2$ |
|---|---|---|
| 0.9 | 93 inches | 0.011 inches. |
| 0.8 | 32.7 inches | 0.011 inches. |
| 0.7 | 17.7 inches | 0.011 inches. |

The last line does not necessarily give the shortest over-all length of the filter because given a tolerable mode conversion, the tapered connecting sections are longer for smaller $$\frac{\lambda_{c2}}{\lambda_{c1}}$$

The problems of minimization of the over-all filter length and of the ways of providing the right cut-off wavelengths by changing the waveguide diameter or by partially filling the waveguide with dielectric material are not considered here.

It is apparent that by replacing the high-pass filters 84 and 85 in FIG. 9 with either band-rejection or bandpass filters, the band-splitting filter of FIG. 9 can be converted to a channel-dropping filter. If the filters 84 and 85 are replaced with band-repection filters, no additional modifications are required in the circuit. However, when filters 84 and 85 are replaced with bandpass filters, some modification of the circuit of FIG. 9 is required as shown in FIG. 11.

The channel-dropping filter shown in FIG. 11 comprises two balanced hybrids 90 and 91 interconnected by wave paths 92 and 93 each of which includes a bandpass filter 94 and 95. Wavepath 93 also includes two 90 degree time phase delay networks 96 and 97. It will be noted that the phase delay networks are on opposite sides respectively of the bandpass filter 95. Thus, phase delay network 97 is between hybrid 90 and filter 95 whereas phase delay network 96 is between filter 95 and hybrid 91.

In operation, a plurality of input signals having center frequencies $f_1, f_2 \ldots f_n$ are applied, through a circulator 98, to port 1 of hybrid 90 wherein they divide and couple to wave paths 92 and 93. Upon reaching filters 94 and 95, the signal to be dropped, for example $f_1$, continues to propagate on through the bandpass filters whereas the remaining signals are reflected back toward hybrid 90. In accordance with the invention the reflected wave energy in path 93 is delayed 180 degrees with respect to the wave energy in wave path 92 by virtue of its double passage through the time delay network 97. The reflected signals are recombined in branch 1 of hybrid 90 and are coupled to the output terminal of the channel-separating filter by means of circulator 98.

In a prior art channel-separating network using quadrature phase shift directional couplers, the reflected wave energy undergoes no relative phase shift and emerges from port 4 of hybrid 90. In accordance with the invention, however, broadbanding is achieved by introducing a 180 degree relative phase shift to the reflected wave energy thereby directing it to port 1 of hybrid 90. Because the incident wave energy and the reflected wave energy both appear at port 1, the circulator 98 is employed to keep the two signals apart.

The portion of the dropped signal $f_1$ in wave path 93, having undergone a 90 degree time phase delay in network 97, is no longer in the proper phase relationship with respect to the portion of the dropped signal in wave path 92 to recombine in hybrid 91. Accordingly, a compensating phase delay is inserted in one of the wave paths. In FIG. 11 an additional phase delay network 96 is inserted in wave path 93. By so doing, the component of wave energy at frequency $f_1$ in wave path 93 also undergoes a 180 degrees phase shift with respect to the component of wave energy at frequency $f_1$ in wave path 92. Thus, the circuit is broadbanded in accordance with the invention for both the reflected wave energy and the dropped-channel. However, since the dropped-channel is relatively narrowband, broadbanding with respect to the dropped-channel may not be deemed necessary. Accordingly, the compensating network can, alternatively, be placed in wave path 92 if this is more convenient. However, depending upon where the compensating phase delay network 96 is placed, the dropped-channel will leave hybrid 91 either through branch 3, as indicated in FIG. 11, or through branch 2.

In all cases it is understood that the above described arrangements are merely illustrative of a small number of the many possible specific embodiments which can represent applications of the principles of the invention. Numerous and varied other arrangements can readily be devised in accordance with the principles by those skilled in the art without departing from the spirit and scope of the invention.

What is claimed is:

1. A broadband power-dividing network for electromagnetic wave energy having a power division ratio of unity comprising two substantially identical 3 db 90 degree hybrid junctions, each hybrid having two pairs of conjugate branches, first and second wave paths each of which connects one branch of one pair of conjugate branches of one hybrid junction to one branch of one pair of conjugate branches of the other hybrid junction, and a phase shifter located in one of said paths for introducing a relative time phase difference $\varphi=\pm\pi(\frac{1}{2}+2n)$ to wave energy propagating therethrough with respect to wave energy propagating through the other of said paths, where $n$ is an integer.

2. A broadband power-dividing network for electromagnetic wave energy having a finite over-all power-division ratio R comprising two substantially identical quadrature hybrid junctions each having a power division ratio $r$ which varies as a function of frequency, each of said hybrids having two pairs of conjugate branches, a source of wave energy connected to a branch of one pair of conjugate branches of one of said hybrids, a pair of useful load circuits connected to the two branches of one pair of conjugate branches of the other of said hybrids, means for simultaneously coupling wave energy from said source to both of said loads in the ratio R comprising two wave paths each of which connects one branch of the other pair of conjugate branches of said one hybrid to one branch of the other pair of conjugate branches of said other hybrid, and phase-shifting means for introducing a relative time phase difference $\theta$ to wave energy propagating through one of said paths with respect to the wave energy propagating through the other of said paths, where $\theta$ varies as a function of frequency to maintain R within preassigned limits over a given range of operating frequencies.

3. The combination according to claim 2 wherein said hybrid junctions are a pair of three decibel directional couplers.

4. A duplexing circuit comprising a pair of three decibel directional couplers each having two pairs of conjugate branches, a power sensitive switch coupled to each branch of one pair of conjugate branches of one of said couplers, and two wave paths each of which connects one of said switches to a branch of one pair of conjugate branches of the other coupler comprising equal lengths of rectangular waveguide having substantially identical internal cross-sectional dimensions, one of said waveguides being rotated about its longitudinal axis through an angle of 180 degrees relative to the other of said waveguides.

5. A broadband power-dividing network for electromagnetic wave energy comprising two substantially identical quadrature phase shift hybrid junctions, each having a power-division ratio which varies as a function of frequency, each junction having two pairs of conjugate branches, first and second wave paths comprising two equal lengths of rectangular waveguide, each of said waveguides connecting one branch of one of said pairs of conjugate branches of one hybrid junction to a branch of one pair of conjugate branches of the other hybrid junction, characterized in that one of said waveguides is twisted about its longitudinal axis through an angle of 180 degrees relative to the other of said waveguides.

6. A band-splitting filter for dividing a band of operating frequencies into two subbands comprising a pair of balanced quadrature phase shift hybrid junctions each having two pairs of conjugate branches, two wave paths each of which connects one branch of one of said pairs of conjugate branches of one hybrid junction to a branch of one pair of conjugate branches of the other hybrid junction, a high-pass filter having a cut-off frequency within said band of frequencies located in each of said wave paths, and means for introducing a 180 degree relative time phase shift to wave energy propagating through one of said paths with respect to wave energy propagating through the other of said wave paths within said subband of frequencies higher than said cut-off frequency located within said wave paths between said filters and one of said hybrid junctions.

7. A channel-separating filter for isolating wave energy at a given frequency from within a band of operating frequencies comprising a pair of balanced quadrature phase shift hybrid junctions each having two pairs of conjugate branches, two wave paths each of which connects one branch of one of said pairs of conjugate branches of one hybrid junction to a branch of one pair of conjugate branches of the other hybrid junction, a band-rejection filter tuned to said given frequency located in each of said wave paths, and means for introducing a 180 degree relative time phase shift to wave energy propagating through one of said wave paths with respect to wave energy propagating through the other of said wave paths over said band of frequencies located within said wave paths between said filters and one of said hybrid junctions.

8. A channel-separating filter for isolating wave energy at a given frequency from within a band of operating frequencies comprising a pair of balanced quadrature phase shift hybrid junctions each having two pairs of conjugate branches, two wave paths each of which connects one branch of one of said pairs of conjugate branches of one hybrid junction to a branch of one pair of conjugate branches of the other hybrid junction, a bandpass filter tuned to said given frequency located in each of said wave paths, a first 90 degree time phase delay network located between the band-rejection filter in one of said wave paths and said one hybrid junction, and a second 90 degree time phase delay network located between the band-rejection filter in one of said wave paths and the other hybrid junction.

References Cited by the Examiner

UNITED STATES PATENTS

| | | | |
|---|---|---|---|
| 2,561,212 | 7/51 | Lewis | 333—11 |
| 2,795,763 | 6/57 | Tillotson | 333—11 |
| 2,858,513 | 10/58 | Lewin et al. | 333—83 |
| 2,884,600 | 4/59 | Fox | 333—11 |
| 2,923,896 | 2/60 | Leake | 333—13 |

HERMAN KARL SAALBACH, *Primary Examiner.*